United States Patent Office.

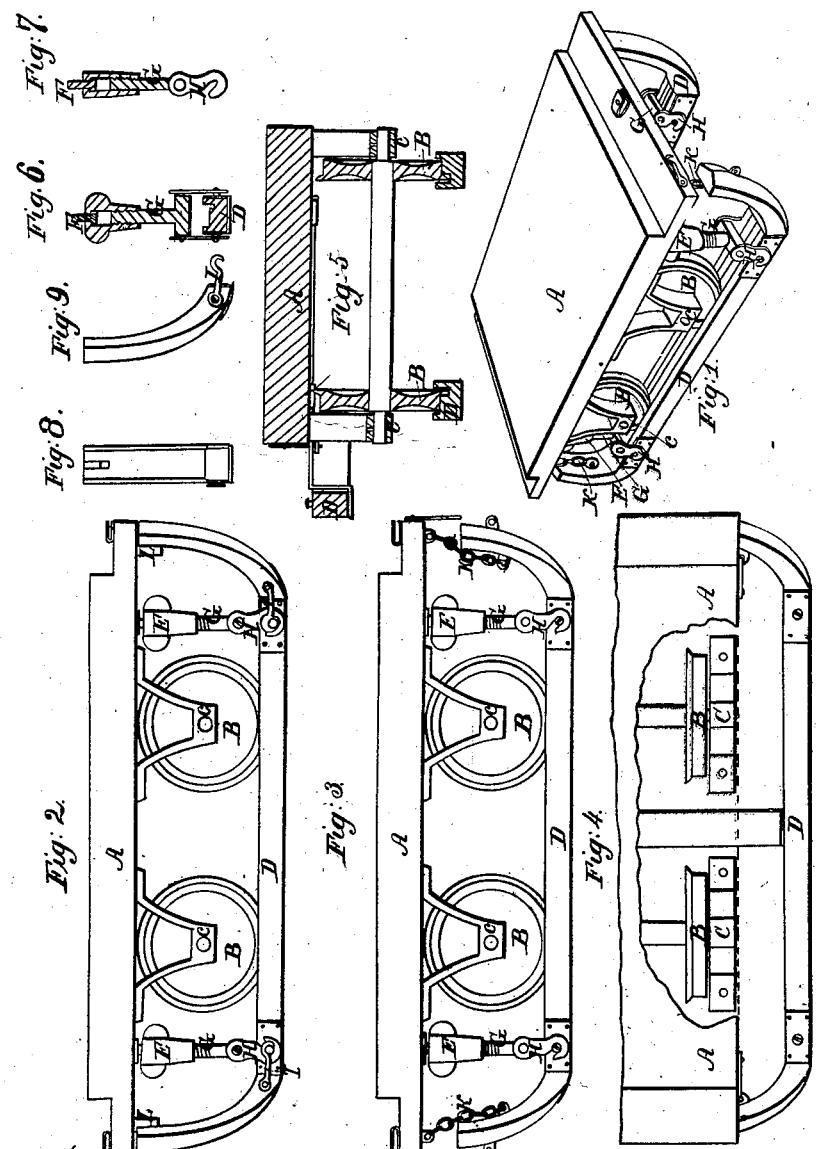

JOHN I. HERRICK, OF MILWAUKEE, WISCONSIN.

Letters Patent No. 77,485, dated May 5, 1868; antedated April 28, 1868.

IMPROVEMENT IN STREET-CARS.

*The Schedule referred to in these Letters Patent and making part of the same.*

TO ALL WHOM IT MAY CONCERN:

Be it known that I, JOHN I. HERRICK, of the city and county of Milwaukee, and State of Wisconsin, have invented a new and useful Improvement in Street-Cars; and I do hereby declare that the following is a full, clear, and exact description thereof, which will enable those skilled in the art to make and use the same, reference being had to the accompanying drawing, forming part of this specification, in which—

Figure 1 is a perspective view of a car with runners under the wheels.

Figure 2, a side view.

Figure 3, side view, showing one of the runners hung with chains at the ends, to admit of its being turned up and secured to the sides of the car, forming a side-platform.

Figure 4, top sectional view, showing one of the runners attached to the side of the car.

Figure 5, transverse sectional view.

Figure 6, sectional view of connecting-bolts, hooks, and nut.

Figure 7, side view of connecting-apparatus.

Figure 8, front view of runner-end.

Figure 9, side view of runner-end.

Similar letters of reference in each of the figures indicate corresponding parts.

The object of my invention is to construct a car so that it may be used on wheels in the ordinary way, or on runners, like a sled or sleigh, when there is snow.

A, the platform or bottom of the car; B, wheels; C, boxes for the axles of the wheels, secured to the car-body in the usual way; D, sleigh-runners. These runners are made in three pieces; the centre-piece straight, with groove for the wheels, and the end-pieces curved, so that the car may be hauled in either direction. E, nuts; F, bolts, connecting nut E to bottom of car; G, connecting-iron, with screw on its upper end entering nut E, and made like an inverted T at its lower end; H, hooks attached to connecting-iron, hooking over pins in the runners D; I, hooks to connect the runners, and keep them from drawing apart; K, chains connecting the ends of runners D to the car-bottom; L, hooks securing the ends of runners D to the car-bottom.

Operation.

The car is run on to the centre-pieces D, bolt F is run through nut E, and secured to car-bottom A, connecting-iron G is then screwed into nut E, the nut being turned to accomplish that result. The end-pieces of runners D are put in place, and the connections made with hooks H and I, and their upper ends secured to the car-bottom A by hooks L. Nuts E are then turned till the runners are firmly fastened to the car, when it is ready for use as a vehicle on runners. When the snow is gone, disconnect the runners and take them off, and a wheel-vehicle is again formed. This sliding-apparatus may be made use of as side-platforms of the car, as shown in fig. 4, by turning the runners up and securing them to the sides of the car.

What I claim as my invention, and desire to secure by Letters Patent, is—

1. Runners D, constructed and connected substantially as and for the purposes set forth.

2. In combination with said runners, the attaching-apparatus E, G, and H, and the hooks and supports, substantially as and for the purpose set forth.

3. Platform or bottom A, wheels B, and runners D, in combination substantially as and for the purpose set forth.

JOHN I. HERRICK.

Witnesses:
J. B. SMITH,
G. W. MYGATT.